United States Patent [19]
Morrison

[11] Patent Number: 4,575,124
[45] Date of Patent: Mar. 11, 1986

[54] REPRODUCIBLE GRAY SCALE TEST CHART FOR TELEVISION CAMERAS

[75] Inventor: Eric F. Morrison, Redwood City, Calif.

[73] Assignee: Ampex Corporation, Redwood City, Calif.

[21] Appl. No.: 591,664

[22] Filed: Mar. 20, 1984

Related U.S. Application Data

[63] Continuation of Ser. No. 365,197, Apr. 5, 1982, abandoned, which is a continuation of Ser. No. 139,513, Apr. 11, 1980, abandoned.

[51] Int. Cl.⁴ ............. B42D 15/00; G01J 1/02; H04N 17/00
[52] U.S. Cl. ................. 283/1 A; 356/243; 358/139
[58] Field of Search .......... 283/1 R, 1 A; 356/243, 356/421, 422, 423, 424; 358/10, 35, 41, 53, 209, 139

[56] References Cited

U.S. PATENT DOCUMENTS

| | | | |
|---|---|---|---|
| 2,657,611 | 11/1953 | Borth | 356/243 |
| 2,763,833 | 8/1956 | Brumbaugh | 358/139 X |
| 3,612,760 | 10/1971 | McKechnie | 358/139 |
| 3,879,749 | 4/1975 | Baum | 358/139 X |
| 4,285,004 | 8/1981 | Morrison et al. | 358/41 X |

FOREIGN PATENT DOCUMENTS 0731198  2/1943  Fed. Rep. of Germany ...... 358/139

Primary Examiner—Paul A. Bell
Assistant Examiner—Taylor J. Ross
Attorney, Agent, or Firm—George B. Almeida; John A. Bucher; Harry G. Thibault

[57] ABSTRACT

A gray scale test chart for television cameras, in the form of either a transmittance chart or reflectance chart, includes one or more regions having selected gray values for calibrating or adjusting the output signal of the television camera, each gray value region being formed by an array of uniformly black dots arranged on a uniformly white background in a spatial frequency selected with respect to the resolution capability of the camera to produce an integrated output signal while being within the resolution capability of a photographic or other chart reproduction technique, the size of the dots in each region determining its gray value in combination with the spatial frequency or center-to-center spacing of the dots.

16 Claims, 3 Drawing Figures

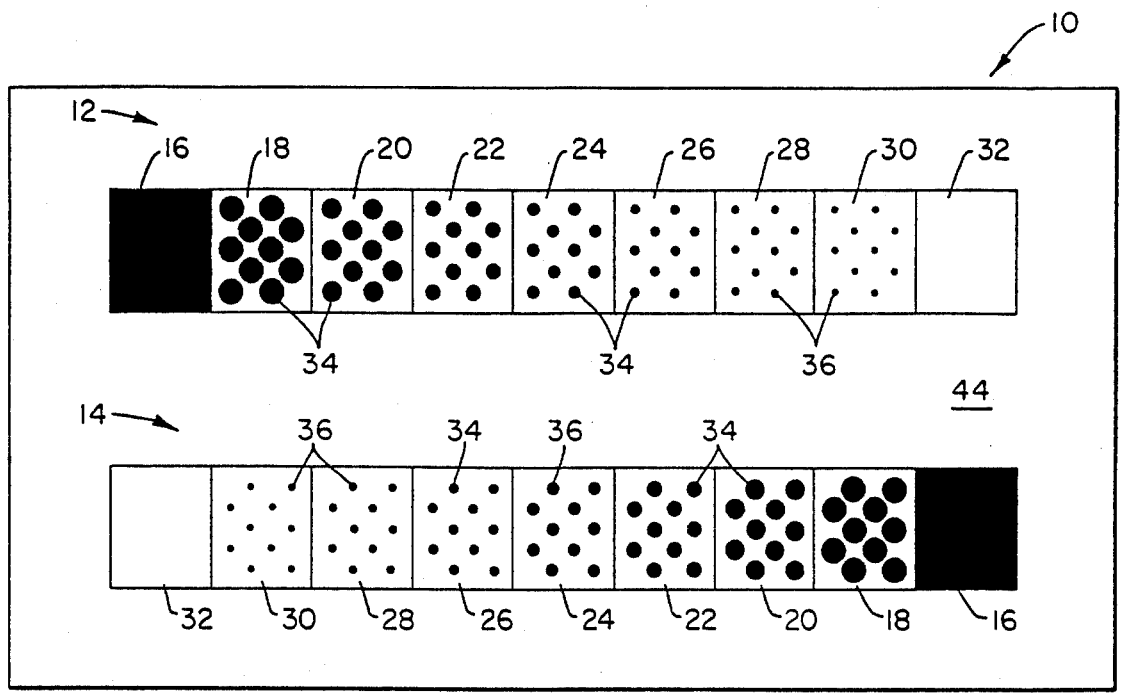
FIG_1
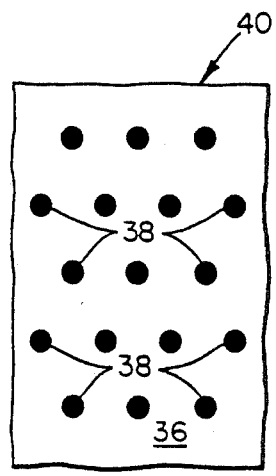
FIG_2
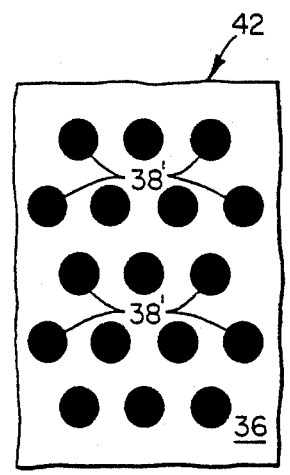
FIG_3

REPRODUCIBLE GRAY SCALE TEST CHART FOR TELEVISION CAMERAS

This is a continuation of application Ser. No. 365,197, filed Apr. 5, 1982, now abandoned, which is a continuation of U.S. Ser. No. 139,513, filed Apr. 11, 1980, now abandoned.

BACKGROUND OF THE INVENTION

The present invention relates to gray scale test charts for television cameras and more particularly to the gray value configuration in one or more regions of the gray scale test charts.

In television systems including television cameras and television receivers, it is common practice to employ gamma correction or compensation in order to correct for deficiencies of non-linear response in the television receivers, due to transfer characteristics of the picture tube, and thereby produce linear relation between the optical or light intensity input of the camera and the light intensity output at the receiver screen. In any event, this relationship between electrical and light intensity signals is well known in the television art. The problem could be resolved either by adjustment in the camera or receiver. However, it has become common practice in the television industry to make this adjustment in the camera for both black and white or color systems because of the lesser number of units involved. In color systems, the same adjustment is made within each of the three color channels of a television camera. According to industry practice, the electrical signal output of the camera is raised to a predetermined law such as the 0.45 power before it is transmitted to the receiver or before it is stored for subsequent use in the receiver or monitor.

Gray value test charts having one or more regions of known gray values are commonly used for providing a standardized calibration or adjustment in the output of the television camera. One common form for a gray value test chart includes a series of regions or chips having different gray values extending either from relatively absolute black to relatively absolute white or vice versa, the scanning of the gray scale chart by the television camera producing a test signal observed on an oscilloscope or the like which permits manual adjustment of the camera to produce the desired signal increase. Preferably, the gray scale chart includes a series of chips in the form of progressively increasing gray values in inverse relation to the 0.45 law or gamma adjustment desired for the camera. The output signal from the camera, as viewed in the oscilloscope or the like, may then be manually adjusted in order to produce a linear result when the electrical signal output of the camera is raised to the desired 0.45 power law. A common format for the gray value test chart includes one series of gray values progressing from relatively absolute black to relatively absolute white through, for example, a total of nine different chips with a different series of nine chips being physically reversed on the chart and progressing from a relatively absolute white value to a relatively absolute black value.

Practical limits are contemplated for the absolute black values and absolute white values employed in the gray scale chart. For example, it is not possible to reproduce a true jet black having zero reflectance or transmittance. Rather, absolute black is generally considered to comprise approximately 2% reflectance or transmittance. Similarly, absolute white is considered as a practical matter to comprise approximately 60% reflectance or transmittance. These values have been found to be very satisfactory for use in calibrating television cameras since the scenes or objects to be viewed by the cameras are normally included within these relative limits.

In the prior art, gray scale test charts have been produced by manufacturing paint chips which are essentially monochromatic and have varying percentages of light reflectivity or transmittance between the minimum and maximum limits referred to above. The chips are then tested in order to determine the actual presence of any color and to precisely determine the percentage of light reflectivity. Therafter, different sets of these chips are selected to form the stepped gray value regions in the test charts, the chips being secured to the chart as a progressively varying series in the manner referred to above.

This painstaking trial and error method for producing accurate gray value test charts in the prior art has resulted in pigmentation in the various chips produces continuous or uniform substantial expense and problems in reproducibility. For example, reflectance values across the respective gray value regions. Accordingly, as the test charts are exposed to heat and light, the different gray value regions tend to fade or discolor in different amounts, thereby upsetting or undesirably changing the closely regulated progression of gray values in the series of chips. When this occurs, the test chart must be replaced in order to assure continued precise calibration of the television camera.

It is also customary to use photographic transparencies as transmittance charts. These charts are prepared from the same source, for example, and additionally suffer from the non-linear transfer characteristic of the photographic process.

Accordingly, there has been found to regain a need for an accurate and readily reproducible gray scale test chart of either a reflectance or transmittance type, which will preferably be effective for use over extended periods of time.

SUMMARY OF THE INVENTION

It is therefore an object of the invention to provide a gray scale test chart having one or more gray value regions for use in calibrating or adjusting television cameras, the gray scale test chart being adapted to simplify its construction and to assure accuracy of its gray value region or regions both initially and over extended periods of operation.

It is a further object of the invention to provide such a gray scale test chart for television cameras, in the form of either a transmittance chart or reflectance chart, including one or more regions having selected gray values for calibrating or adjusting the output signal of the television camera, each gray value region being formed by an array of dots of a substantially uniform black color arranged on a background of a substantially uniform white color, the array of black dots having a spatial frequency selected with respect to the resolution capability of the camera to produce an integrated output signal while being within the resolution capability of a suitable reproduction technique, the size of the dots in each region determining its respective gray value in combination with the spatial frequency of the dots. Preferably, the spatial frequency for the dots is determined in a relatively simple manner by the center-tocenter spacing therebetween. Even more preferably, the spatial frequency or center-to-center spacing of the dots is uniform both horizontally and vertically on the gray scale test chart.

A gray scale test chart according to the present invention may take one or more different forms. For example, the gray scale test chart may be in the conventional form of a series of gray value regions, arranged in a progression of light transmittance or reflectance values, for suitably calibrating or adjusting the output signal of a television camera. By the same token, a gray scale test chart according to the present invention may also be constructed with a limited number or even a single gray value region similarly adapted for calibrating or adjusting the output signal of a television camera. In this regard, reference is made to a copending patent application, Ser. No. 124,370 filed on Feb. 25, 1980 by E. F. Morrison and T. E. Zank, now U.S. Pat. No. 4,285,004, and assigned to the assignee of the present invention. That application discloses a test chart for use in error correction of a television camera, the test chart including a test pattern in the form of black and white characters adapted for producing a desired signal response in the television camera to permit calibration or adjustment of the camera for one purpose or another. At the same time, the test chart of that application includes a gray value background surrounding the black and white characters referred to above, the gray value background serving in the same manner as the test charts referred to above for gamma correction in the television camera. The above-noted copending reference is accordingly incorporated herein as though set out in full. Preferably, the test chart of the above application contemplates a background having approximately 50% electrical output for a television camera in which the signal has been raised to the 0.45 power by a gamma corrector. Such a value is preferred for a single gray value background of this type since it conforms to an average between the absolute black and absolute white values to be theoretically observed by the camera. However, it will be apparent that test charts including a single gray value background or region may also be employed with other values of light transmittance or reflectance. At the same time, it will also be obvious that a gray scale test chart for television cameras may be constructed in accordance with the present invention having different numbers of gray value regions in various cnfigurations.

Additional objects and advantages of the invention are made apparent in the following description having reference to the accompanying drawings.

BRIEF DESCRIPTION OF THE DRAWINGS

FIG. 1 is a representation of a gray value test chart constructed in accordance with the present invention and including a sequence of gray value regions having a progression of light reflectance or transmittance values for adjusting or calibrating a television camera.

FIGS. 2 and 3 are enlarged fragmentary portions respectively of two different gray value regions from the test chart of FIG. 1 in order to demonstrate the manner of forming different gray values according to the present invention.

DESCRIPTION OF THE PREFERRED EMBODIMENT

One example of a gray scale test chart constructed in accordance with the present invention is generally indicated at 10 in FIG. 1. The test chart 10 is of a generally conventional type including two series of chips or regions respectively indicated at 12 and 14. The upper series 12 includes a total of 9 regions indicated respectively at 16–32. The upper series 12 commences at the left end with the region 16 which is substantially black in accordance with the preceding description. Preceeding rightwardly through the upper series 12, the gray values for the successiver chips or regions are related in approximately an ascending 2.2 power law, in inverse relation to the 0.45 output power curve desired for the television camera. The television camera may thus be calibrated or adjusted in the manner described above by producing an electrical display signal corresponding to the light output for the different gray value regions in the series 12. At the same time, the second series 14 commences at the left with a chip similarly indicated at 32 and being substantially white. Progressing rightwardly through the lower series 14, the regions are arranged in a substantially descending 2.2 power law. In any event, substantially white regions 32 are arranged at the right end of the upper series 12 and at the left end of the lower series 14. Similarly, substantially black regions 16 are arranged at the left end of the upper series 12 and at the right end of the lower series 14.

The intermediate gray value regions 18–30 are of primary concern in connection with the present invention. As in prior art gray value test charts, these intermediate regions must provide light intensity values which are intermediate between the substantially black region 16 and the substantially white region 32. The problem of accurately reproducing these intermediate gray value regions, as discussed at length above, is overcome by the present invention in that the intermediate regions 18–30 are formed by dots or indicia 34, having a uniform substantially black quality, arranged on a uniform background 36 having a uniform substantially white quality.

It will of course be obvious that a similar result could be achieved by arranging substantially white dots or indicia upon a substantially black background. However, the present configuration is preferred in order to adapt the test chart for reproduction by photographic and other similar techniques.

In any event, the dots 34 are indicated as circles in the drawings but could also be of any other shape. The dots are arranged upon the background forming each of the regions with a spatial frequency or center-to-center spacing selected with respect to the resolution capability of the camera in order to assure production of an integrated output signal corresponding to the average light output value for the entire region.

In considering the output picture of the television camera, the signal from the camera produces a series of horizontal lines across the screen, each horizontal line being formed by a series of electronically reproduced points of different light intensity. Accordingly, the electronic sequence across each line generally exhibits greater resolution than the line-to-line sequence encountered vertically on the screen. Different spacings or spatial frequencies could be employed horizontally and vertically in accordance with the resolution capability of the camera. However, in order to simplify production of the chart and to avoid the need for arranging the chart in only one configuration before the camera, the present invention contemplates similar spacing or spatial frequency in both horizontal and vertical directions.

As noted above, it is necessary to provide a spatial frequency which exceeds the resolution capability of the camera while being within the resolution capability of a photographic or other chart reproduction technique. In this regard, a television system typically has a band width, in the horizontal direction, of about 5 MHz. The camera tube and its associated optics have negligible or usable output at a substantially increased frequency of for example 16 MHz. Thus, a 16 MHz frequency between the dots, in both horizontal and vertical directions, in order to be certain that the pattern in the gray value regions exceeds the resolution capability of the camera. With such a spatial frequency being maintained for the arrangement of dots, the camera or more properly the camera tube and its associated optics will thereupon integrate intensity information from the black dots and surrounding white background to produce a signal corresponding to an average gray value for the entire region or selected area of black dots and surrounding white background.

Assuming that the test chart of FIG. 1 has dimensions of, for example, eight inches horizontally and six inches vertically, a 16 MHz spatial frequency would be established with approximately 100 dots per inch. Accordingly, in each of the intermediate regions 18-30 for both of the series 12 and 14 on the test chart, the same spacing is employed both horizontally and vertically for the dots. The respective white intensity for each of the intermediate regions 18-30 is then achieved by varying the size of the individual dots. The ability to vary the light intensity for the different regions is demonstrated in FIGS. 2 and 3 wherein dots 38, and 38', having similar center-to-center spacing, are arranged in separate regions 40 and 42. The regions 40 and 42 generally correspond to the intermediate regions 18-30 in the test chart 10. However, the regions 40 and 42 are illustrated in order to emphasize the ability of the present invention to precisely generate selected gray values. The gray values for the regions 40 and 42 are not in the relation required for the series 12 and 14. While the dots 38' in FIG. 3 have the same center-to-center spacing as the dots 38 in FIG. 2. Accordingly, the region 42 of FIG. 3 has four times the black content compared to the region 40 of FIG. 2. Conversely, the amount of white value in the region 42 is reduced by the same amount of area. Thus, it may be seen that by varying the size of the dots, the selected gray values or light intensities may be accurately achieved for each of the intermediate regions 18-30.

The test chart 10 or any other selected gray scale test chart may be formed in accordance with the present invention by applying substantially black dots with a predetermined center-to-center spacing and with different sizes in order to reproduce different gray values or light intensities. It will also be apparent within the scope of the invention that it would be possible to vary the spatial frequency for the dots somewhat in order to adjust the gray value for the selected regions. For example, as long as the spatial frequency for all of the regions exceeds the resolution capability of the camera, dots of the same size could be arranged in closer relation to each other within one of the intermediate test chart regions in order to produce reduced light intensity. However, the preferred embodiment of the invention as illustrated in the drawings includes dots of similar center-to-center spacing with differences in dot size providing the desired variation in gray value.

The center-to-center spacing and the relative size of dots in the various regions of the chart 10 of FIG. 1 are not illustrated to scale nor do they accurately portray the progression for the series of regions. This general relationship for different regions having similar center-to-center spacing and different dot sizes is illustrated in FIGS. 2 and 3.

Further in connection with the test chart 10, the two series 12 and 14 may be formed upon a relatively neutral background 44. The background 44 could for convenience also be made of a similar dot structure to form a conventional neutral gray background. In forming the test chart 10, it is of course essential to maintain the same color content for the white background and for the dots respectively. One suitable reproduction technique for forming a number of the test charts 10 would be the preparation of the test chart from substantially white art paper, the dots 34 being applied to the respective regions 16-32 as ink, paint or the like. The different regions 16-32 could even be formed from commercially available art paper if the center-to-center spacing for the dots and the requirements for uniform color and black and white values in the dots and backgrounds are followed.

With a first test chart being formed in this manner, a large number of test charts could then be reproduced photographically, preferably employing high resolution or "fine grain" and "high cntrast" film in order to better reproduce the more absolute black and white colors of the dots and background respectively. By employing the same negative film or positive printing paper in such a photographic techinque, large numbers of similar test charts could be formed in relatively simple and rapid fashion.

However, in any such reproduction technique, it is necessary as noted above to assure that the spatial frequency for the dots is within the resolution capability of the reproduction technique. That requirement is of course assured in the photographic process which can be readily adapted for precisely accurate resolution at a spatial frequency corresponding to the above noted 16 MHz. At the same time, it is also necessary to assure that the minimum size of any dots is also capable of precise reporoduction in the technique. For example, in a photographic technique, it would be generally necessary to assure that the dots are substantially larger than the grain size of the film. Thus, the photographic technique would be very capable of accurately and precisely reproducing the gray scale test chart of the present invention.

In addition to simplifying and facilitating production of the test chart, it is also noted that a test chart constructed in accordance with the present invention would also tend to provide more accurate calibration over extended periods of time. As noted above, prior art test charts upon being exposed to light and heat, for example, tended to fade or discolor to different degrees within the different gray value regions or chips, thus upsetting the precise relation of light intensity for the series of chips. Within the present invention, all of the intermediate gray value regions 18-30 as well as the absolute black regions 16 and the absolute white regions 32 are formed from a combination of the same black and white values. Thus, discoloration or fading would tend to occur to the same relative degree in all of the test chart regions and the precise light intensity relation throughout the chip series 12 and 14 would tend to remain constant over long periods of time.

Variations are of course possible within the scope of the present invention as best exemplified by the reference noted above and incorporated into the present application. As described in that application, one or more gray scale regions may be formed in a variety of configurations on a test chart suitable for calibration or adjustment of a television camera. As noted in the incorporated reference, a single gray value region forms a background for a registration chart formed from black and white characters designed to permit spatial error correction both horizontally and vertically in the camera. At the same time, the gray value background of that chart similarly serves for gamma correction of the camera in the same manner described above. Other variations will also be obvious within the scope of the present invention which is accordingly defined only by the following appended claims.

What is claimed is:

1. A gray value test chart formed by a selected reproduction technique in combination with a television camera for calibrating or adjusting the output signal of the television camera, the camera and the reproduction technique having respective resolution capabilities, the combination comprising:

the gray value chart having a plurality of regions having selected gray values, each gray value region being formed by an array of indicia, each indicium of the array being of a uniform similar size and of a substantially uniform black value arranged on a background of a substantially uniform white value, the size of the indicia being varied for each successive gray value region, the array of indicia for each gray value region being arranged on the background of each gray value region with a selected spatial frequency for the array of the indicia for each gray value region; and the television camera having the selected resolution capability which responds to said array, the size of indicia, and its selected spatial frequency to cause the camera to produce an integrated output signal in response to the chart while being within the resolution capability of the reproduction technique;

whereby the array, the uniform size, and the selected spatial frequency of the indicia on each background provide a combined area which, in combination with the television camera and the resolution capability associated therewith, defines the gray value for each region.

2. The gray value test chart of claim 1 wherein the indicia are generally round dots.

3. The gray value test chart of claim 1 wherein said chart is a photographic reproduction.

4. The gray value test chart of claim 1 wherein said chart is a photographic reproduction.

5. The gray value test chart of claim 1 wherein the plurality of regions comprises a series varying from a substantially black region to a substantially white region, a plurality of intermediate regions being arranged between the black and white regions and having progressively varying gray values, the indicia for all of the intermediate regions being of substantially the same black value as the substantially black region, the background for all of the intermediate regions being of substantially the same white value as the substantially white region, the combined area of the indicia in each region with the background thereof determining the gray value of each region within the resolution capability of the reproduction technique.

6. The gray value test chart of claim 5 wherein the indicia in each of the intermediate regions have similar spatial frequencies both horizontally and vertically.

7. A method of forming a gray value test chart for use in calibrating or adjusting the output signal of a television camera having a predetermined resolution capability, the chart including a plurality of regions having respectively different selected gray values, the method of forming the gray value test chart by means of a selected reproduction technique having a predetermined resolution capability comprising the following steps;

first, selecting an array of indicia, each indicium of a uniform similar size and of a substantially uniform black value for arranging on a background of a substantially uniform white value;

second applying the array of indicia on the background with a uniform spatial frequency to form a gray value region;

third, providing successive gray value regions by varying the size of the indicia for each array and applying each array on a respective background with the uniform spatial frequency;

wherein, the array, the size of indicia, the uniform spatial frequency for each region coacts with the resolution capability of the camera to cause the camera to produce an integrated output signal corresponding to a gray value output in response to each region while being within the resolution capability of the reproduction technique; and fourth, combining a series of successive gray value regions to produce a gray value test chart, whereby the array, the uniform size, and the uniform spatial frequency of the indicia on each background provide a combined area which, in combination with the resolution capability of the camera, defines the gray value for each region.

8. The method of claim 7 wherein the indicia as defined in the first step are generally round dots.

9. The product of the method of claim 7.

10. The method of claim 7 wherein said chart as defined in the fourth step is formed by a photographic reproduction technique.

11. The method of claim 10 wherein the indicia as defined in the first step have a uniform color content throughout the chart and the white background has a uniform color content throughout the chart.

12. The product of the method of claim 10.

13. The method of claim 7 wherein the plurality of regions as defined in the third step comprises a series of regions progressing in stepwise manner from a substantially black region to a substantially white region, with a plurality of intermediate regions being arranged between the black and white regions and having progressively varying gray values, the indica for all of the intermediate regions being of substantially the same black value as the substantially black region, the background for all of the intermediate regions being of substantially the same white value as the substantially white region, the combined area of the indicia in each region with the background thereof determining the gray value of each region within the resolution capability of the reproduction technique.

14. The method of claim 13 wherein the indicia as defined in the first step in all of the intermediate regions have similar spatial frequencies both horizontally and vertically.

15. The method of claim 13 wherein said chart as defined in the fourth step is formed by a photographic reproduction technique.

16. The product of the method of claim 13.

* * * * *